3,070,558
COMPOSITION CONSISTING OF CELLULOSE ACETATE AND POLY-N,N' DIMETHYLACRYLAMIDE

Harry W. Coover, Jr., Kingsport, Tenn., assignor to Eastman Kodak Company, Rochester, N.Y., a corporation of New Jersey
No Drawing. Filed July 17, 1953, Ser. No. 368,807
1 Claim. (Cl. 260—17)

This invention relates to the modification of textile and other materials, particularly materials having a basis of cellulose ester in order to improve their dyeing properties.

Cellulose esters have little, if any, affinity for water-soluble dyes containing acid groups, such as those used for dyeing wool. This property is often disadvantageous since many of the wool dyes are easily applied and relatively cheap. Furthermore, the development of cellulose acetate staple fiber renders it particularly desirable to be able to dye such staple fiber with the conventional wool dyes.

It has been realized that cellulose acetate is an excellent fiber for blending with wool; however, due to the fact that the acetate-wool blends could not be satisfactorily union dyed, its use in such mixtures has been restricted. Dyeing of a material consisting of wool and cellulose acetate in the same dye bath has resulted very often in each of the components having a different color. Clearly, this was undesirable and the development of dyes suitable for these blends was both expensive and difficult.

I have made the discovery that cellulose esters can be modified with homopolymers and copolymers of N-alkyl substituted acrylamides and methacrylamides to produce so-called animalized cellulose fibers having excellent affinity for direct, wool, acetate and vat dyes. Therefore, they may be blended with wool and the resultant fibers dyed with the same dye. These union dyed fabrics or fibers exhibit washing and dye fastness properties equivalent to or better than those exhibited by dyed wool alone.

Cellulose acetate modified according to the process of this invention can be readily dyed in all shades of blue and green with the usual acetate dyes to give dyeings which show greatly improved gas fastness properties.

One object of this invention is to provide a modified cellulose ester having improved dyeing properties. Another object is to provide an animalized cellulose acetate material which, when blended with wool, gives excellent union dyeings with wool dyes. A further object is to provide a modified cellulose acetate which may be readily dyed in all shades of blue and green with the usual acetate dyes to give dyeings which show greatly improved gas fastness properties. An additional object of this invention is to provide a process for modifying cellulose esters by mixing with N-alkyl substituted acrylamides and methacrylamides.

The above objects of this invention are obtained by modifying cellulose esters with homopolymers and copolymers of N-alkyl substituted acrylamides and methacrylamides. More specifically, this invention is concerned with the modification of cellulose esters with acetone-soluble homopolymers and copolymers of N-alkyl substituted acrylamides and methacrylamides. The homopolymer modifiers should include acrylamides having the structure

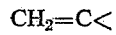

wherein R' is hydorgen or an alkyl group containing from 1–4 carbon atoms, and R is an alkyl group containing from 1–4 carbon atoms, or

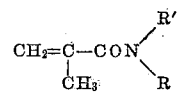

wherein R' may be hydrogen or an alkyl group containing from 1–4 carbon atoms, and wherein when R' is hydrogen, R is an alkyl group containing 2–4 carbon atoms. When R' is an alkyl group containing from 1–4 carbon atoms, R is an alkyl group containing from 1–4 carbon atoms.

Copolymers of these acrylamides and methacrylamides which are valuable for use in this invention contain from 80–100% of the above described amides. Suitable monomers for copolymerization with the amides are unsaturated compounds having the structure $$CH_2=C<$$

In order for modifiers to be operable in our invention, they must not only be soluble in acetone, but must also be compatible with cellulose acetate. Homopolymers and copolymers prepared from monomers having the above defined structure have been found to be readily soluble in acetone and compatible with cellulose esters. Compatibility of the polymers of this invention with cellulose esters is completely unexpected since it is generally known that most polymers are not compatible with one another. The unsubstituted acrylamide and methacrylamide polymers are insoluble in acetone and, of course, would not be operable in my invention. Also, N-methylmethacrylamide is insoluble in acetone and, hence, is inoperable in my invention. These particular amides do not fall within the scope of this invention.

Cellulose ester compositions containing from 5–30% by weight of the homo- or copolymer modifiers of this invention can be used. However, the preferred range is 10–20 parts by weight. Cellulose esters modified according to the process of this invention when spun into fibers show good to excellent affinity, depending on the concentration of modifier, for all classes of dyes.

The homopolymer and copolymer modifiers of this invention can be prepared by homopolymerizing or copolymerizing the N-substituted acrylamides and methacrylamides by the usual methods, such as solution, emulsion and bulk polymerization using free radical peroxide type or other suitable catalysts. The polymerizations can also be catalyzed by heat, ultravoilet light, etc. The modified cellulose esters can be prepared by either dissolving separately or together the amide modifier and the cellulose ester in acetone. If dissolved separately the solutions are combined. The acetone solutions can then be spun into fibers either by dry spinning or wet spinning process.

The following examples will further illustrate this invention:

Example 1

Fibers spun from an acetone solution of cellulose acetate containing 15 percent poly-N-isopropylacrylamide showed excellent affinity for acetate, direct, wool, and vat dyes. Acetate dyes which have poor gas fastness showed excellent gas fastness on these fibers.

Example 2

Fibers spun from an acetone solution of cellulose acetate containing 10 percent of poly-N,N'-dimethylacrylamide showed excellent affinity for acetate, direct, wool and vat dyes.

Example 3

Fibers spun from acetone solution of cellulose acetate containing 30 percent of a copolymer made up of 70 percent N-methylmethacrylamide and 30 percent acrylonitrile showed excellent affinity for direct, acetate, wool, and vat dyes.

*Example 4*

Fibers spun from an acetone solution of cellulose acetate containing 20 percent of poly-N-tert-butylacrylamide showed excellent affinity for direct, acetate, vat, and wool dyes.

*Example 5*

Fibers spun from an acetone solution of cellulose acetate containing 10% by weight of poly-N-methylacrylamide showed excellent affinity for direct, acetate, vat and wool dyes. Blends of this fiber with wool gave excellent union dyeings with such wool dyes as Brilliant Milling Blue B (Prototype No. 37), Fast Red S, conc. (Color index 176), and Milling Orange G (Color index 377).

*Example 6*

Fibers spun from an acetone solution of cellulose acetate containing 20% by weight of poly-N,N-dimethylmethacrylamide showed excellent affinity for direct, acetate, vat and wool dyes. Samples of the fibers or fabric dyed with Eastman Blue BNN (Prototype 228) exhibited excellent gas fastness. Unmodified cellulose acetate showed very poor gas fastness when dyed with this same dye.

*Example 7*

Fibers spun from an acetone solution of cellulose acetate containing 15 parts of a copolymer of 80% N-ethylmethacrylamide and 20% methylacrylate showed excellent affinity for acetate, vat and wool dyes.

*Example 8*

Fibers spun from an acetone solution of cellulose acetate containing 10 parts of a copolymer of 90% N-isoporpylacrylamide and 10% acrylonitrile showed good affinity for acetate, vat and wool dyes.

*Example 9*

Fibers spun from an acetone solution of cellulose acetate containing 15% of a copolymer of 85% N,N-dimethylmethacrylamide and 15% vinyl acetate showed good affinity for direct, acetate, vat and wool dyes. A 50–50 blend of this fiber with viscose gave an excellent union dyeing with Dark Orange G (Color index 478).

*Example 10*

Fibers spun from an acetone solution of cellulose acetate containing 25% by weight of poly-N-methyl-N-ethylmethacrylamide showed excellent affinity for direct, acetate, vat and wool dyes.

*Example 11*

Fibers spun from an acetone solution of cellulose acetate containing 15% by weight of a copolymer of 90% N,N-dimethylacrylamide and 10% methylmethacrylate showed excellent affinity for direct, acetate, vat and wool dyes.

Wherever a percentage is indicated herein in the specification and claim, it is intended and should be understood to be by weight.

Cloth manufactured from fibers modified according to this invention possesses the excellent properties found in cellulose acetate fabric. Blended with natural fiber the resulting fabric combines the advantages of both materials, for instance, combining the high elasticity of the natural fiber with the high ductility of the acetate fiber. As a result of this invention, the possible combinations are great in number and have widespread utility, particularly in the apparel field.

I claim:

A composition of matter consisting of 70–95% acetone-soluble cellulose acetate and 30–5% of acetone-soluble poly-N,N'-dimethylacrylamide.

References Cited in the file of this patent

UNITED STATES PATENTS

| | | |
|---|---|---|
| 1,986,854 | Reid | Jan. 8, 1935 |
| 2,267,842 | Schlack | Dec. 30, 1941 |
| 2,311,548 | Jacobson | Feb. 16, 1943 |
| 2,397,454 | Woodward | Mar. 26, 1946 |
| 2,790,789 | Miller | Apr. 30, 1957 |